Jan. 23, 1968  M. GOODMAN  3,364,597
PROGRAMMABLE MACHINE FOR TEACHING AND QUESTION-AND-ANSWER GAMES
Filed Oct. 20, 1965  6 Sheets-Sheet 1

FIG.1

|  | DIALS- A B C D |
|---|---|
| QUESTIONS- | ANSWER CODE Nos 3 8 9 4 |

1.- IN WHAT COUNTRY IS MT. VESUVIUS?
  A          B          C          D
  GREECE     INDIA      ITALY      SPAIN

2.- HOW MANY SIDES HAS AN OCTAGON?
  A          B          C          D
  SEVEN      TEN        FOUR       EIGHT

3.- WHO WAS THE FIRST VICE PRESIDENT OF THE
    UNITED STATES?
  A              B                  C              D
  JOHN ADAMS     THOMAS JEFFERSON   JOHN JAY       AARON BURR

9.- IN WHAT CITY IS THE EIFFEL TOWER?
  A          B          C          D
  LONDON     MOSCOW     PARIS      ROME

10.-"OLD HICKORY" WAS THE NICKNAME OF WHICH OF
    THE FOLLOWING PRESIDENTS?
  A          B          C              D
  COOLIDGE   LINCOLN    T. ROOSEVELT   JACKSON

COMBINATION CHART

| DISC CONTACT SLOTS | 1 5 9 | 2 6 10 | 3 7 | 4 8 | 1 5 9 | 2 6 10 | 3 7 | 4 8 | 1 5 9 | 2 6 10 | 3 7 | 4 8 |
|---|---|---|---|---|---|---|---|---|---|---|---|---|
| D I A L   N U M B E R S  A | 1 | 2 | 3 | 4 | 5 | 6 | 7 | 8 | 9 | 10 | 11 | 12 |
| B | 5 | 6 | 7 | 8 | 9 | 10 | 11 | 12 | 1 | 2 | 3 | 4 |
| C | 9 | 10 | 11 | 12 | 1 | 2 | 3 | 4 | 5 | 6 | 7 | 8 |
| D | 3 | 4 | 5 | 6 | 7 | 8 | 9 | 10 | 11 | 12 | 1 | 2 |

200

Jan. 23, 1968   M. GOODMAN   3,364,597
PROGRAMMABLE MACHINE FOR TEACHING AND QUESTION-AND-ANSWER GAMES
Filed Oct. 20, 1965   6 Sheets—Sheet 2

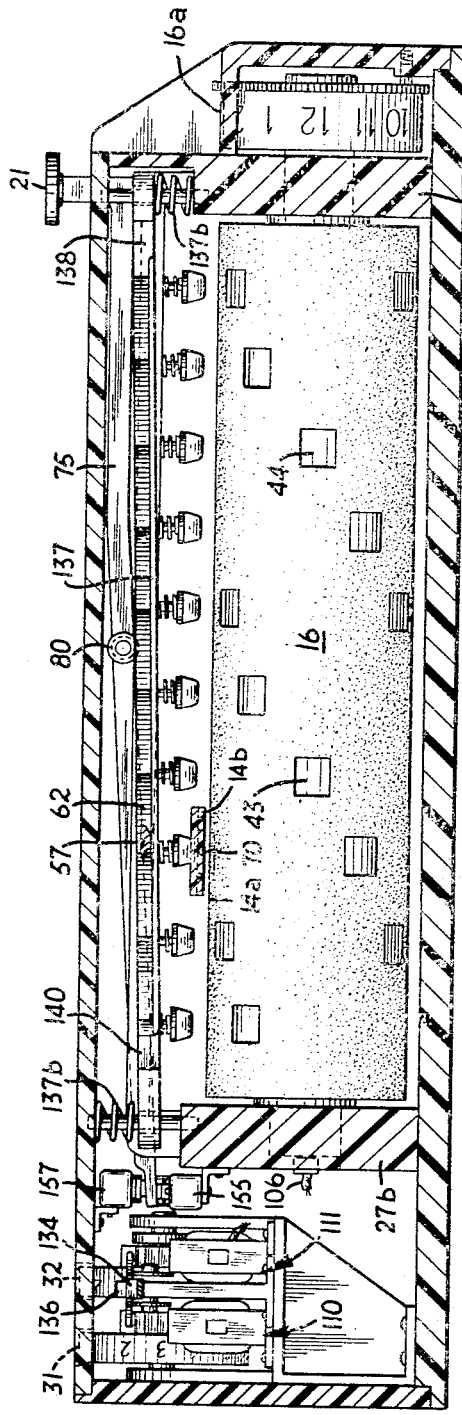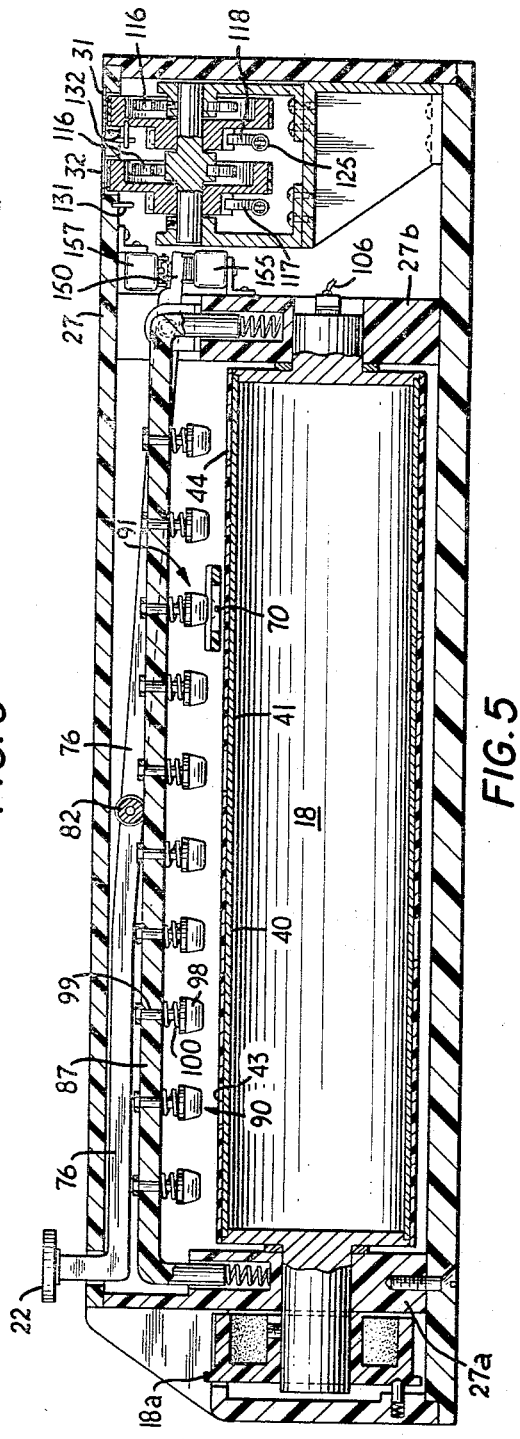

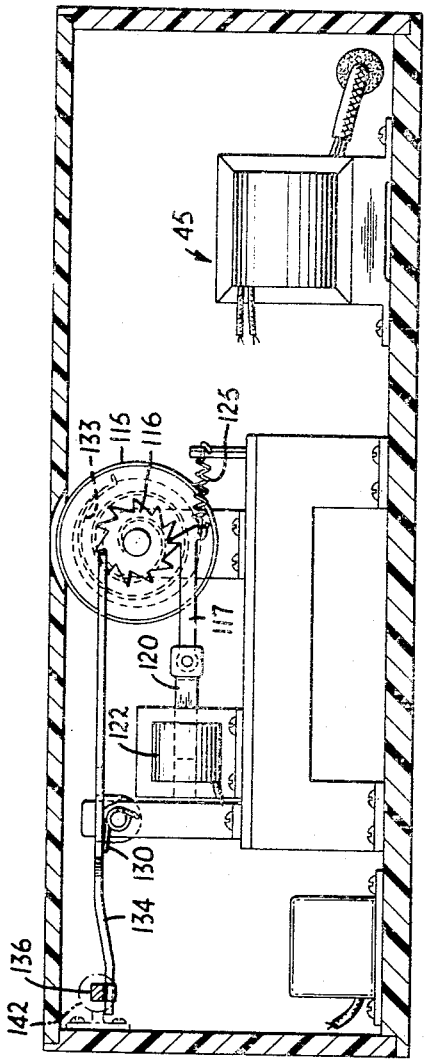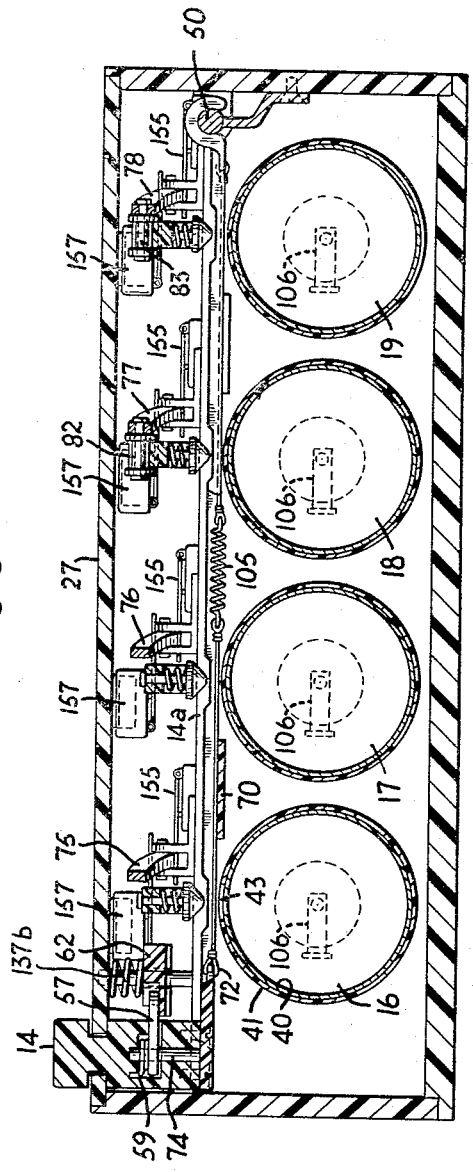

Jan. 23, 1968    M. GOODMAN    3,364,597

PROGRAMMABLE MACHINE FOR TEACHING AND QUESTION-AND ANSWER GAMES

Filed Oct. 20, 1965    6 Sheets-Sheet 6

United States Patent Office 3,364,597
Patented Jan. 23, 1968

1

3,364,597
PROGRAMMABLE MACHINE FOR TEACHING
AND QUESTION-AND-ANSWER GAMES
Milton Goodman, 160—96 65th Ave.,
Flushing, N.Y. 11365
Filed Oct. 20, 1965, Ser. No. 498,634
16 Claims. (Cl. 35—9)

This invention relates generally to programmed machines and more particularly to a programmed machine usable as a teaching machine or for question-and-answer games.

Programmed machines of all types are known for controlling all kinds of operations of the machine or of other machines controlled by the programmed machine. Programmed training machines have recently been employed along with conventional teaching methods to feed knowledge in tiny bits in step-by-step teaching to an operator or user of the machine. The imparting of knowledge has also been employed in games from which the players of the game can not only enjoy themselves and test their knowledge, but will learn from the game contents. The new machines and methods of learning are credited with results which, apparently, are much better than conventional teaching methods.

It is a principal object of the present invention to provide a programmed machine which can be used for teaching or testing the knowledge of the user of the machine.

Another object of the present invention is to provide a machine which is readily programmable for playing question-and-answer games testing the knowledge of the player or players.

Another object of the invention is to provide a machine which can be programmed with a very large number of programs or combinations.

A feature of the machine is the provision of programmable circuit means comprising programming means in the form of cylindrical drums for defining a multiplicity of circuits and selectively operable to a plurality of different angular positions for presetting different circuits in the circuit means corresponding to different programs in the machine at different periods of time. The programs correspond to operative preset conditions of readiness of the machine in which other operative conditions of the machine can be effected in dependence upon, at least partially, of the first operative conditions preset in the machine. Thus, according to the machine of the invention, the settings set in the program cylinders will determine the possibility of operating the machine in accordance with a program or combination of conditions for indicating a correct or incorrect answer to a question posed to the machine perator from a set or sequence of questions corresponding to the coded condition of the machine.

The machine is provided with indicator means having counters which are electrically connectable to the programmed circuits during operation for indicating visually indicia representative of whether the response given to an interrogatory posed to the operator is answered correctly or incorrectly. The questions asked must be asked and answered in a sequence correlated with respective ones of the operative conditions or circuit programs programmed into the machine.

Selector means in the form of a manually movable selector comprising a movable wire contact cooperates with the programmed cylinders for setting the conditions for operation of the machine under conditions making it pos-

2 sible to correctly answer the interrogatories. The selector means is operable to a plurality of successive positions in a given sequence which correspond to the respective sequence of interrogatories being asked the user of the machine.

In order to preclude cheating, the machine provides that the selector means can be moved to the successive positions in the sequence of positions only in one direction and there is no possibility of returning to a previous position for again attempting to answer a question after a question or interrogatory has been answered.

Provision is made in the machine for actuating one of a plurality or bank of keys or operators comprising switches for representing a correct or incorrect answer, in the machine, to a question. Because of the preset or programmed condition of the machine, the operation of the correct switch for indicating a correct answer will indicate that the interrogatory has been answered correctly and if a switch other than the one indicating a correct answer is operated, indication is made by the machine of indicia indicative that the question or interrogatory has been answered incorrectly.

Circuitry associated with the switches provides for precluding the possibility of operating a "correct" switch in such a manner as to operate a counter indicating the correct answer twice when answering a question whose answer is known by the operator. This keeps the machine operator from attempting to obtain a high count of correct answers, by answering one question, in anticipation of being unable to correctly answer other interrogatories.

Other features and advantages of the machine in accordance with the program machine in accordance with the present invention will be better understood as described in the following specification and appended claims, in conjunction with the following drawing in which:

FIG. 1 is a plan view of instructions for programming the machine according to the invention and the interrogatories to be posed in accordance with the code or program preset into the machine;

FIG. 2 is a chart illustrating the manner in which combinations or programs are developed for presetting the machine of the invention;

FIG. 5 is a section view taken along section line 5—5 of FIG. 4;

FIG. 6 is a longitudinal section view taken along section line 6—6 of FIG. 4;

FIG. 7 is a cross-section view taken along section line 7—7 of FIG. 4;

FIG. 8 is a cross-section view taken along section line 8—8 of FIG. 4;

Figure 3:
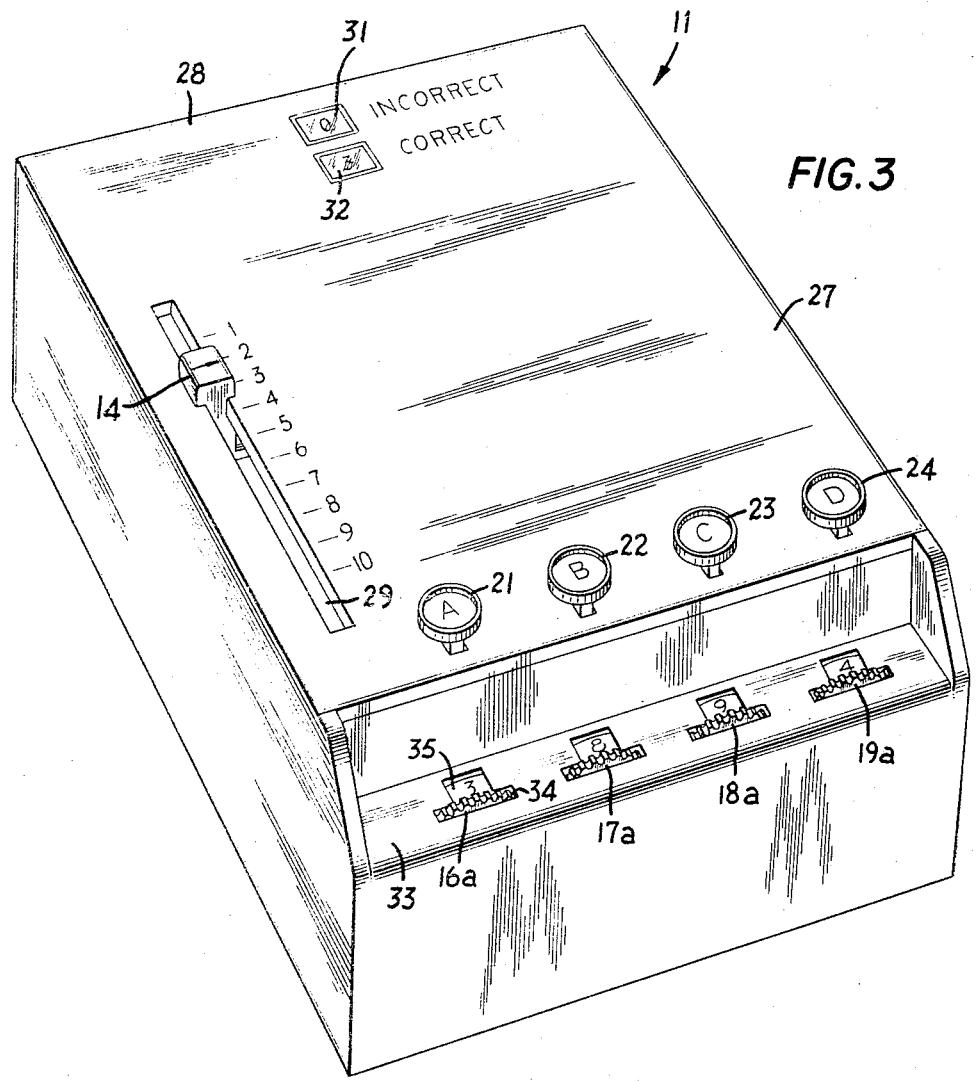
FIG. 3 is a perspective view of a machine in accordance with the present invention.

As illustrated in the drawings, a programmed machine 11 can be programmed according to programming instructions shown on a sheet 12. The instructions 12 can be instructions held by a teacher, for example, who is to use the apparatus for interrogating or testing the knowledge of a student. Moreover, the instructions 12 can be instructions that would be used, for example, in a game such as on television for directing the interrogation of the participants in a question-and-answer game and for programming the machine as later described.

The instructions 12 include a set of questions, for example, questions 1 through 10 in a given sequence. This sequence is the sequence in which the questions must be answered by positioning a selector 14 in the various positions designated 1–10 on the machine 11 as shown in FIG. 3. The sheet 12, on the right hand corner, denotes dial settings for setting or programming cylindrical drums or cylinders 16, 17, 18 and 19 disposed parallel longitudinally in the machine and having dials thereon 16a, 17a, 18a, 19a with indicia corresponding to answer code numbers which are set to denote the angular or code position of respective cylinders which cooperate with a plurality of keys or switches 21, 22, 23 and 24, designated with the letters A, B, C, and D, when answering the individual questions as hereinafter described.

The machine 11 comprises a casing or housing 27 made of a suitable material, for example, an impact plastic. The casing has a top, upper surface 28 in which is cut a longitudinal slot 29 through which selector means 14 extends outwardly and inwardly of the casing 27 and is guided for travel longitudinally of the slot 29. The casing upper surface is marked with numerals 1–10 inclusive alongside of the slot 29 for indicating the operative positions of the selector 14 to which it must be moved in succession each time a question is to be answered as later described. The position of the question selector 14 is illustrated, FIG. 3, as being at the third position 3, for example, in which the third question posed the student or game player is to be answered and the machine is in readiness for the selector to be moved to the next position 4 in the sequence. The upper surface is provided with a pair of windows 31, 32 through which indicating means, hereinafter described as including counters, visually indicate indicia representative of whether responses to the given interrogatories or questions posed have been answered incorrectly or correctly as denoted by the legend alongside the respective windows. In the example illustrated in FIG. 3, three correct answers have been given and there have been no incorrect answers.

The keys or switches 21–24 designated as indicated heretofore extend upwardly and outwardly of the housing as illustrated and have inner arm or lever portions for effecting operation as hereinafter described. The casing 27 is provided with an offset surface 33 lower than the surface 28 provided with a plurality of slots, for example a slot 34 through which each of the dials 16a–19a have a peripheral portion extending outwardly thereof so that the respective programming cylinder, for example cylinder 16, can be moved to a selected preset angular position corresponding to the code or program set forth on the instruction sheet 12. The other programming cylinders are thus readily accessible from outwardly of the casing to program or "code" the machine.

The machine is provided with a plurality of windows, for example a window 35, through which the code numbers corresponding to the angular position to which each cylinder is to be preset can be seen. In the example illustrated, the "answer code" set in the machine is 3894 indicating that the respective cylinders should be set at angular positions so that the members read in the windows 35 correspond to the "code number" in preparation for answering the questions in the program sheet or instructions and question sheet 12. These "code" numbers can thus be seen in the respective windows through which the dials are seen. The machine is thus programmed or preset as to its operative first conditions. It is, of course, understood that, before answering the questions, the question selector 14 would be in a position in readiness for movement to the first operative position designated 1 and the questions are answered successively by moving the operator 14 to each operative position in sequence and actuating the proper button or key switch 21–24 that will cause the indicator means of the invention to indicate whether the questions have been answered correctly or not as hereinafter described in detail.

Figure 10:
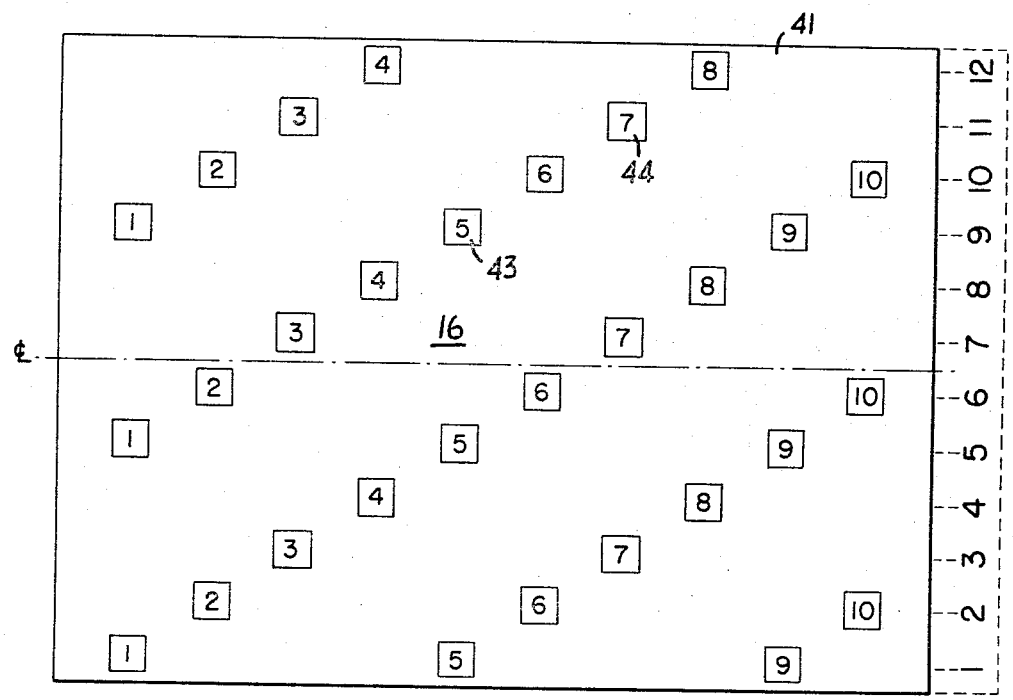
FIG. 10 is a developed view of a programming cylinder illustrated in the apparatus in the machine as shown in FIG. 4.

In the embodiment of the invention illustrated in the drawings, the programming cylinders extend longitudinally generally in a common direction and are rotatably mounted on mount portions 27a, 27b of the casing. Each cylinder comprises a tubular conductor 40 covered externally, peripherally with an insulating cover 41 made, for example, of an insulation plastic. Each cylinder is provided with a plurality of contact portions, for example, contact portions or surfaces 43, 44 which are disposed angularly spaced around the cylinder and spaced longitudinally on the cylinder. For example, the contact portions may be disposed, FIG. 10, substantially in a helical configuration about a cylinder. These contact portions are defined by discontinuities in the insulation 41 so that direct mechanical and electrical contact can be established with the contact portions which are conductive portions on the tubular conductor 40. These contact portions define in conjunction with other circuitry later described, a plurality of programmable circuits.

The programmable circuit means comprises a power supply 45 including a transformer 45a having connections 45b for connecting a primary winding 46 thereof to a standard alternating current outlet for stepping down the output thereof in a secondary winding 47 to which are electrically connected a conductor 49 constantly energized and a rod conductor 50. The metallic rod conductor 50 is mounted extending longitudinally along one side internally of the casing 27 and the other energized lead 49 is disposed on an opposite side. A third conductor 52 is connected to a conductor 53 having a plurality of contact portions, for example, contact portions 55 and 56.

The selector means comprising selector 14 is provided with a conductive pawl 57 pivotally mounted thereon and constantly biased by a biasing spring 59 to a position in which it abuts against a stop surface 60 of the selector 14. The pawl 57 cooperates with a fixed ratchet or rack 62. As the selector 14 is moved from its operative position designated 1 to the position designated 10, the pawl 57 is operated or deflected by individual teeth on the ratchet, for example, teeth 63 as hereinafter described.

Figure 4:
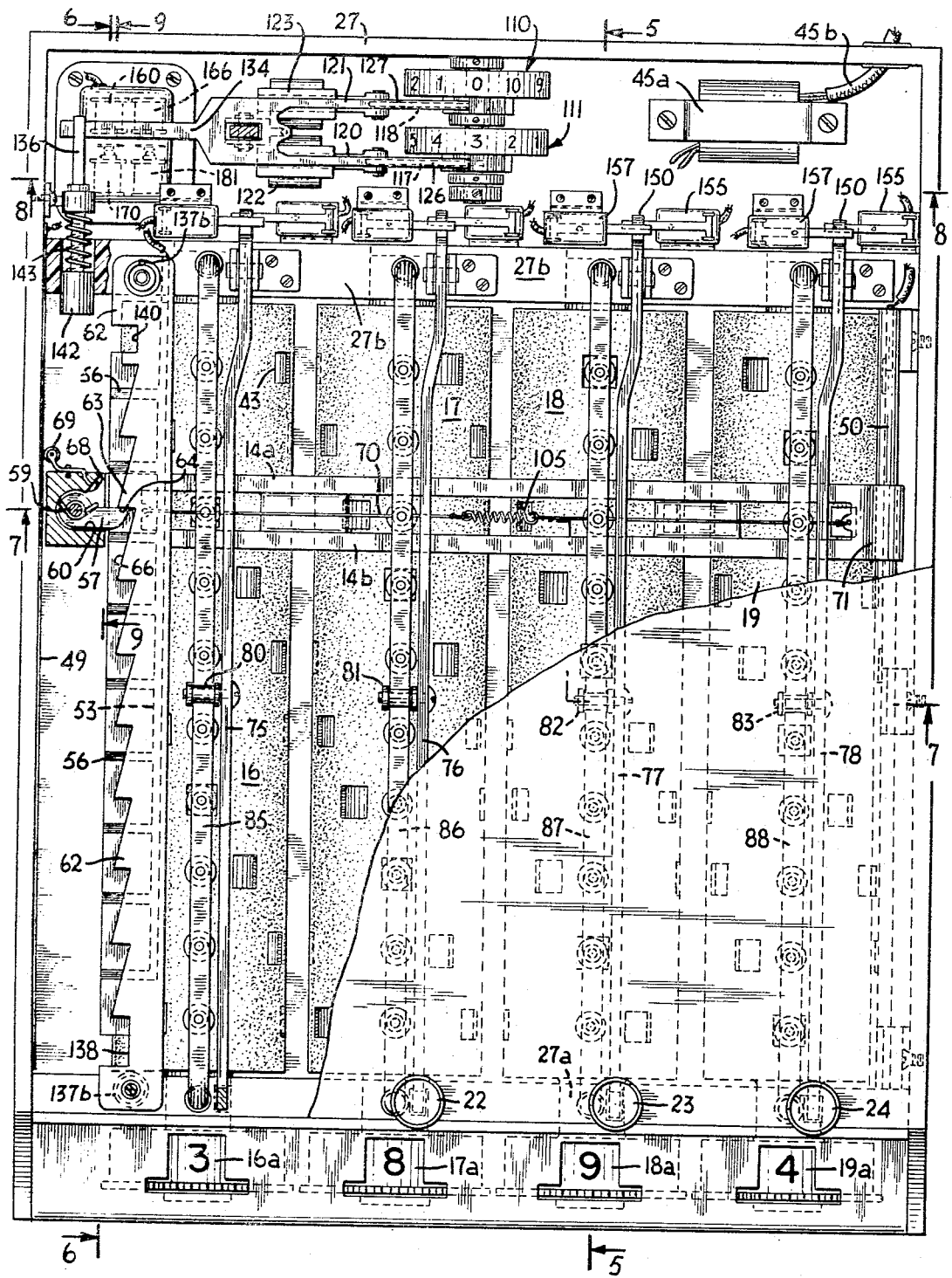
FIG. 4 is a plan view of the machine shown in FIG. 3 with a top cover removed illustrating the overall internal components of the machine.

In the position of the pawl illustrated in FIG. 4 corresponding to an operative position of selector 14, the pawl is engaging a stop, flat surface 64 of the tooth 63 and is held in the position illustrated while engaging a contact portion of the conductor 53. The spring 59 biases the pawl in a counterclockwise direction. It can be seen that the individual flat surfaces of the teeth preclude the selector means from being returned to a prior operative position. Thus the movement of the selector means to the position in the sequence of operative positions is without possibility of returning the selector means to a prior position in the sequence of positions that correspond to the sequence of the questions. Thus it is impossible to cheat in the present apparatus. Each question selection must take place successively. Each question must be answered successively and only once within the programmed conditions established as later described.

As the selector 14 is moved from position to position in a step-by-step manner, a curved end camming surface of the pawl engages a slanted surface, which acts as a camming surface on each tooth, for example, a camming surface 66 of the next successive tooth in the rack in the position in which the pawl is shown in FIG. 4. The pawl is cammed by the individual slanted tooth surfaces to a position in which it bridges or makes contact with a fixed contact 68, FIG. 11, connected to a rolling or wiper contact 69 constantly making electrical contact with the conductor 49 for a purpose hereinafter described.

The selector means includes a bridge comprising two spaced arms 14a, 14b extending across the housing and the programming cylinders. A contact wire 70 is disposed on the bridge transversely of the longitudinal axis of the programming cylinders between the two arms and is connected to an electrical contact slide 71 fixed on the two arms and constantly making electrical contact with the fixed rod conductor 50. At an opposite end thereof the contact wire is connected to a connector 72 electrically insulated and part of the selector 14 which carries a pin 74 on which the pawl 57 is pivotally mounted. It will be seen that a circuit will thus be in readiness to be defined between the power supply and the programming cylinders, as later explained, when the pawl is in electrical contact with the contacts on the conductor 53 and in position in readiness for answering each respective question.

Each of the keys 21–24 function as switch means for effectively establishing a circuit with the pre-programmed circuits established within the programmable circuit means of the invention. Each key is connected to a long lever arm, for example lever arms 75–78, extending longitudinally of the programming cylinders and each pivotally mounted on a pivot, supported on the wall 27b, at an end thereof opposite to the end to which the respective key is connected. Each lever arm is provided with an offset as illustrated in FIG. 5 and a respective roller cam 80–83 pivotally mounted thereon. The individual rollers cooperate with respective ones of a plurality of U-shaped switch elements 85–88. Each switch element supports a plurality comprising a set of fingers such as fingers 90–91 functioning as switch contacts as later described. In the example of the embodiment illustrated, each support is provided with ten fingers since there are ten questions. The support members are biased on opposite ends by respective springs such as springs 95–96 housed in the support walls 27a, 27b for the cylinders thereby maintaining the fingers constantly radially spaced from the respective cylinders and biasing the individual keys 21–24 to a raised position. Each finger is provided with an insulator tip 98 connected to a pin 99 slidable axially with the respective support, and a spring 100 biases the tip in the direction of a respective cylinder which the individual fingers overlie.

When the machine has been programmed for responding to a given set of questions, the preset operative conditions are set therein by positioning the programming cylinders in respective angular positions. Some of the contact portions of the conductors of the cylinders are disposed in alignment with corresponding fingers on the levers. The contact portions in the adjacent cylinders will not be aligned in a straight line in a direction or plane transversely of the longitudinal axis of the cylinders and corresponding to one row of a plurality of aligned rows of fingers transversely of the longitudinal axis of the programming cylinders. For example, when the selector 14 is moved to its third operative position illustrated in the drawings, the wire conductor 70 extends transversely of the cylinders. However, regardless of which one of the keys A, B, C, and D is pressed downwardly, the wire contact 70 will make contact as later described only when the correct key is depressed.

Those skilled in the art will understand that the drawing in FIG. 6 illustrates the apparatus in condition for answering the third question correctly and FIG. 5 illustrates the apparatus in which the other keys, for example key C, would indicate an incorrect answer. When the contact wire 70 is pressed downwardly, a tension spring 105 allows an electrical circuit to be established by the contact wire in conjunction with a contact portion of the respective cylinder contacted by the wire so that a circuit is established through the internal conductor 40, shown diagrammatically in FIG. 11, through a sliding contact 106 provided adjacent the end of each programming cylinder to allow a circuit to be closed for actuating indicating means as hereinafter described. The spring 105 restores the contact wire to a taut condition spaced from the cylinders when an individual key is released after being depressed to answer a question. The spring 100 associated with each finger will allow the fingers not associated with the contact wire to move and allow the electrical circuit established with one contact portion to be closed as before described.

The indicating means in the apparatus comprises a pair of counters 110 and 111 for tallying "incorrect" and "correct" answers respectively. Each counter comprises a drum 115 to which is coaxially connected a ratchet 116 driven by a pawl 117, 118 pivotally connected to an armature 120, 121 of a solenoid 122, 123. The individual solenoids 122, 123 are energized as hereinafter described when one of the keys A–D is depressed and an electrical circuit established therewith through the contact wire 70 and through contact portion of a given cylinder contacted as before described. The ratchet 116 is provided with sufficient teeth so that the respective counter drum is stepped to successive angular positions in which indicia in the form of numerals on the periphery of each drum are brought into position coincident with the respective windows 28, 31 and the number of steps taken by the drum corresponds to the count of correct or incorrect answers respectively. The pawls of each counter are biased by a respective spring, for example a spring 125, to the right in position for the next successive rotation of the counter. The biasing to a position of readiness for the next count takes place when the individual solenoids are deenergized.

Provision is made for holding each of the counters 110, 111, in the position in which a count has been made, by stops 126, 127 which engage the teeth of the ratchets and preclude counterclockwise rotation of the drums. The stops are biased by a spring 130 upwardly to a locking or "stop" position. Whenever the apparatus is to be programmed for the next set of questions and the code set in the programming cylinder in accordance with the instructions as before described, the counters must be zeroized. Accordingly, stops 131, 132 coact each with zeroizing springs, such as spring 133 provided in each counter drum, in zeroizing the counters. When the stops 126, 127 must be released for zeroizing they must be disengaged from the respective ratchet. A release arm portion 134 connected to the stops is generally held in a position overriding the biasing spring 130 and maintaining the stops 126, 127 engaged with the respective ratchets under control of a release cam 136 actuated longitudinally for releasing only each time that the whole set of questions have been answered and the selector 14 is moved to its initial starting position.

As can be seen in FIGS. 4 and 6, the pawl rides on a non-conductive guide means comprising a guide 137 made, for example, of insulating material and having the conductive portions 55, 56 of the conductor 53 therein. This guide 137 has an upper surface along which the pawl 57 rides thereby compressing a spring 137a during travel of the selector 14 from position 1 to position 10 in answering the questions. When the last question is answered the selector 14 is moved past the position designated 10 until the pawl 57 is aligned with a notch 138 which allows the guide to move upwardly so that the pawl is disposed in a plane parallel with an underside surface of the guide 137. The selector can then be moved back with the pawl biasing the guide upwardly against the pressure of a second spring 137b and free of the rack teeth that preclude moving the selector to a prior operative position in the sequence of positions 1–10.

When the selector 14 and the pawl thereon is aligned with a second notch 140 the spring 137b biasing the guide 137 downwardly moves it to a position so that the pawl is again in readiness for movement or travel along the upper side surface of the guide. The rack and guide area free to move or "float" upwardly and downwardly jointly on pins illustrated coaxial with the two biasing springs 137a, 137b.

As the selector 14 is moved toward the second notch 140 to the starting position in readiness for beginning to answer a second set of questions it will engage a release button 142 and compresses a spring 143 constantly biasing the button to a position where it will be engaged by the selector 14 as it is returned to its start position.

Figure 9:
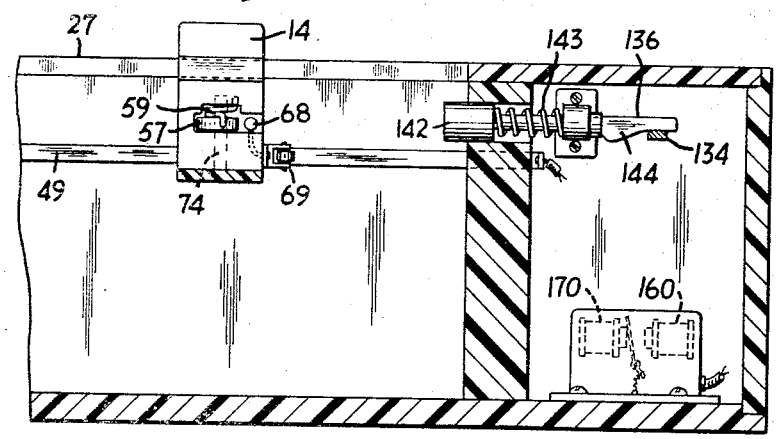
FIG. 9 is a longitudinal section view taken along section line 9—9 of FIG. 4.

The button actuates a counter release cam 144 toward the right in FIG. 9 so that it moves the counter release arm 134 downwardly or counterclockwise against the action of the biasing spring 130 and the stops 126, 127 release the counters so that they are automatically returned to a zero position. When the selector is restored to the position for answering the first question the compression spring 143 restores the button and the counter release cam 144 to the position shown in FIG. 9 in which the counter stops are in position for effecting their "stop" function.

Figure 11:
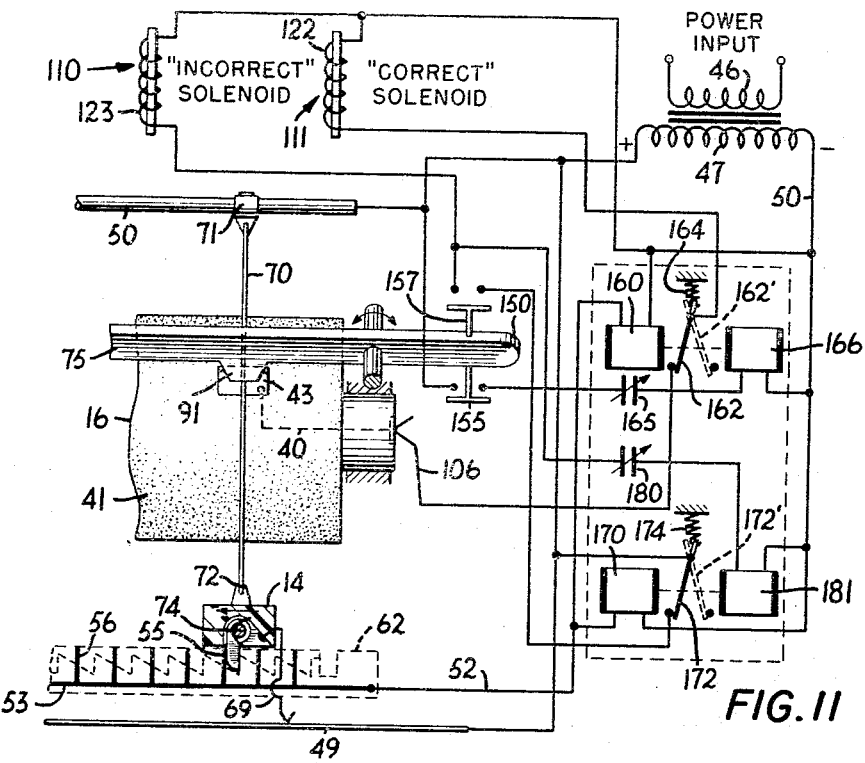
FIG. 11 is a circuit diagram and schematic illustrating the circuitry and mechanical elements for effecting answers according to the invention.

In order to provide for the proper energizing of the "correct" and "incorrect" solenoids and respective counters thereof, each of the lever arms of the individual keys is provided with an end extension, for example extension 150, making contact with contacts of switches shown diagrammatically in FIG. 11 as a lower switch 155 and an upper switch 157 both of which are open when the lever is in a rest position. Each lever extension cooperates with such a pair of switches.

It will be remembered the selector is moved from position to position and if the "correct" key is depressed to "answer" a given question the contact wire 70 will establish a circuit through the internal conductor 40 of the programming cylindrical drum and the contact 106 to the "correct" counter 111. On the other hand, if a key corresponding to an incorrect answer to a given question is depressed the "incorrect" counter 110 is energized and it will count once.

In order to prepare for energizing the proper counter two set-up relay coils 160, 170 are provided. These two operating coils are energized when the pawl 57 on the selector connector contacts or bridges one of the projections, functioning as contacts, on the conductors 52, 53 and the contact 68 so that movable contacts 162, 172 are moved from a centered position where they are held by respective off-center centering springs 164, 174 in position for the one contact 162 to allow energization of the "correct" counter and the other movable contact 172 to allow energization of the "incorrect" counter.

When a key for indicating a correct answer is depressed the circuit through the respective cylinder and associated end contact 106 is closed and an energizing circuit established or completed from the power supply to the "correct" solenoid 122 through the contact 162 shown in position in solid lines. Moreover, the switch 155 is closed applying a pulse delayed by a capacitor 165 to and energizing an operating coil 166 to move the movable contact 162 to a position 162' shown in broken lines thus interrupting the energizing circuit to the "correct" solenoid 122. This precludes the possibility of cheating by depressing a key known to be the proper key for a correct answer more than once. Of course, if an "incorrect" key is depressed there is no contact portion in position on the associated cylinder for the wire contact 70 to contact so no energizing through a cylinder can take place. However, each key when depressed closes an upper switch associated therewith and corresponding to a switch such as the upper switch 157 after closing of its respective lower switch corresponding to the lower switch 155 shown diagrammatically in FIG. 11. It is, of course, understood that only one key switch arm is illustrated in the drawings and that each key has an individual circuit associated with it for operating two counters through the two sets of relay coils illustrated and the movable contacts.

When the upper switch 157 is closed, an energizing circuit for the "incorrect" solenoid 123 is effected through the movable contact 172 when it is in the position shown in solid lines. It can be seen that such a circuit could not be established in the event the key depressed is a "correct" key that establishes an energizing circuit through the movable contact 162 associated with the correct solenoid since then the circuit to the "incorrect" solenoid is also interrupted when the movable contact 162 moves to its open position 162'.

The circuits are prepared for functioning as above described since each time the selector 14 is moved from operative positions to the next successive position in readiness for answering a question the individual teeth on the rack will deflect the contact pawl 57 to its position bridging both the contact 68 and one of the projections or contacts on the conductor 53 simultaneously so that the set-up coils 160, 170 are energized and the respective movable contacts are moved to the positions shown in FIG. 11 in solid lines and the apparatus is in readiness for depressing of a key for "answering" the next question.

Those skilled in the art will recognize that the principles of the present invention can be embodied in different form for setting up a plurality of possible combinations or circuits which can be activated for indicating as in the invention. The apparatus can be "coded" or programmed in a multiplicity of combinations or programs with the programming cylindrical drums or cylinders described. FIG. 2 illustrates a program for the apparatus in the example of settings illustrated in the drawings. As can be seen, a combination chart 200 illustrates the drum contact portions, denoted slots in the chart 200, that are in a position for effecting a circuit with the wire 70 when the drums or cylinders are set in angular positions corresponding to the dial number code 3894. The dial numbers or code set in FIG. 1 are shown shaded. Thus it can be seen that the key A, if depressed, will be used to answer questions one and seven "correctly." In the code set the key designated B must be depressed to indicate a "correct" answer to questions four and eight and key C is used to indicate "correct" answers to questions one, five and nine while key D is used to correctly answer questions two, six and ten.

The combination chart illustrates that, by positioning the drums in different program settings, different contact portions are in position for effecting "correct" answers or counts and a very large number of programs can be set in the apparatus with a few programming cylinders. Moreover, it can be seen that different sets of questions can be used for the same program or "code" set in the machine so long as the questions are arranged in proper order and properly associated with the code. Thus the apparatus lends itself to a wide range of question-and-answer games or tests and the like.

While a preferred embodiment of the invention has been shown and described, it will be understood that many modifications and changes can be made within the true spirit and scope of the invention.

What I claim and desire to secure by Letters Patent is:

1. In a programmed machine usable as a teaching machine or for games and the like comprising, programmable circuit means comprising a power supply and programming means each operable selectively to a plurality of different mechanical positions for defining different electrical circuits each corresponding to respective different positions of each of said programming means and corresponding to different programs in said machine in successive periods of time, said programs corresponding to operative preset first conditions of readiness of said machine in which other operative conditions of said machine can be effected partially in dependence upon the first operative conditions preset in said machine, indicator means in said machine electrically connectable to said circuit means in operation for indicating visual indicia representative of whether responses to given interrogatories posed in a given sequence to a human operator of said machine are answered correctly, said given sequence being correlated with respective ones of said first operative conditions, selector means cooperative with said programming means operable to a plurality of successive positions in a given sequence corresponding to respective interrogatories in said given sequence of said interrogatories, a plurality of switches connected in said circuit means cooperative with said programming means and each actuatable to a respective operative first position when said selector means is in each of said mechanical positions in said sequence of positions thereof and in which one of said switches is effective to cause said indicator means in operation to indicate indicia representative of a correct answer when said selector means is in a respective position in said sequence of positions and the remainder of said switches are ineffective to cause said indicator means to indicate indicia representative of a correct answer if operated to said respective operative first position when said selector means is in said respective position, and said programming means comprising a plurality of means each having a plurality of means positionable in positions in which said selector means and one of said switches are jointly rendered electrically effective and ineffective in defining one of said different circuits within said respective position in the sequence of successive positions of said selector means corresponding to said sequence of interrogatories to cause said indicator means to indicate a correct answer upon actuation of said one switch.

2. In a programmed machine according to claim 1, in which said programming means comprises a plurality of means positionable in a plurality of respective positions for effecting a plurality of circuits effectively closed successively only when said selector means is in said successive positions.

3. In a programmed machine according to claim 1, in which said programming means comprises a plurality of circuit members rotatable relative to each other angularly to a multiplicity of sets of angular relative fixed positions corresponding to said preset conditions, and each set of relative positions corresponding to a respective energizable circuit effectively closed when said one switch corresponding to a correct answer is closed.

4. In a programmed machine according to claim 2, in which said circuit members comprise a plurality of drums relatively rotatable angularly and having means defining said circuits.

5. In a programmed machine according to claim 4, in which said drums comprise a plurality of cylinders disposed extending in a common general direction and having an electrical conductor electrically connected to said indicator means, said cylinders comprising contact portions electrically connected to said conductor disposed spaced thereon for energizing said indicator means to cause said indicator means to indicate when a switch of said plurality of switches is actuated to said operative first position thereof and said selector means is in one of its positions in said sequence of positions thereof.

6. In a programmed machine usable as a teaching machine or for games and the like comprising, programmable circuit means comprising a power supply and programming means operable selectively to a plurality of different positions for setting different programs in said machine in successive periods of time, said programs corresponding to operative preset first conditions of readiness of said machine in which other operative conditions of said machine can be effected partially in dependence upon the first operative conditions preset in said machine, indicator means in said machine electrically connectable to said circuit means in operation for indicating visual indicia representative of whether responses to given interrogatories posed in a given sequence to a human operator of said machine are answered correctly or incorrectly, said given sequence being correlated with respective ones of said first operative conditions, selector means cooperative with said programming means operable to a plurality of successive positions in a given sequence corresponding to respective interrogatories in said given sequence of said interrogatories, means for allowing said selector means to be moved to successive positions in said sequence thereof and without possibility of returning said selector means to a prior position in said sequence of positions of said selector means, a plurality of switches connected in said circuit means cooperative with said programming means and each actuatable to a respective operative first position when said selector means is in each of said positions in said sequence of positions thereof and in which one of said switches is effective to cause said indicator means in operation to indicate indicia representative of a correct answer only when said programming means are in given relative positions of said different positions and said selector means is in a respective position in said sequence of positions and the remainder of said switches will cause said indicator means to indicate indicia representative of an incorrect answer if operated to said respective operative first position when said selector means is in said respective position.

7. In a programmed machine usable as a teaching machine or for games and the like comprising, programmable circuit means comprising a power supply and programming means operable selectively to a plurality of different positions for setting different programs in said machine in successive periods of time, said programs corresponding first to operative preset conditions of readiness of said machine in which other operative conditions of said machine can be effected parially in dependence upon the first operative conditions preset in said machine, counter means in said machine electrically connectable in said circuit means in operation for indicating visual indicia representative of whether responses to given interrogatories posed in a given sequence to a human operator of said machine are answered correctly or incorrectly, said given sequence being correlated with respective ones of said first operative conditions, selector means cooperative with said programming means operable to a plurality of successive positions in a given sequence corresponding to respective interrogatories in said given sequence of said interrogatories, means for allowing said selector means to be moved to successive positions in said sequence thereof and without possibility of returning said selector means to a prior position in said sequence of positions of said selector means, a plurality of switches connected in said circuit means cooperative with said programming means and each actuatable to a respective operative first position when said selector means is in each of said positions in said sequence of positions thereof and in which one of said switches is effective to cause said counter means in operation to indicate indicia representative of a correct answer only when said programming means are in given relative positions of said different positions and said selector means is in a respective position in said sequence of positions and the remainder of said switches will cause said indicator means to indicate indicia representative of an incorrect answer if operated to said respective operative first position when said selector means is in said respective position.

8. In a programmed machine usable as a teaching machine or for games and the like comprising, programmable circuit means comprising a power supply and programming means operable selectively to a plurality of different positions for setting different programs in said machine in successive periods of time, said programs corresponding first to operative preset conditions of readiness of said machine in which other operative conditions of said machine can be effected partially in dependence upon the first operative conditions preset in said machine, indicator means in said machine electrically connectable to said circuit means in operation for indicating visual indicia representative of whether responses to given interrogatories posed in a given sequence to a human operator of said machine are answered correctly or incorrectly, said given sequence being correlated with respective ones of said first operative conditions, selector means cooperative with said programming means operable to a plurality of successive positions in a given sequence corresponding to respective interrogatories in said given sequence of said interrogatories, means for allowing said selector means to be moved to successive positions in said sequence thereof and without possibility of returning said selector means to a prior position in said sequence of positions of said selector means, a plurality of switches connected in said circuit means cooperative with said programming means and each actuatable to a respective operative first position when said selector means is in each of said positions in said sequence of positions thereof and in which one of said switches is effective to cause said indicator means in operation to indicate indicia representative of an incorrect answer if operated to said respective operative first position only when said programming means are in given relative positions of said different positions and said selector means is in said respective position, and means to preclude said switches from causing said indicator means to indicate more than once for each operation of a switch to its respective operative first position.

9. In a programmed machine usable as a teaching machine or for games and the like comprising, programmable circuit means comprising a power supply and programming means operable selectively to a plurality of different positions for setting different programs in said machine in successive periods of time, said programs corresponding to operative preset first conditions of readiness of said machine in which other operative conditions of said machine can be effected partially in dependence upon the first operative conditions preset in said machine, indicator means in said machine comprising counters electrically connectable to said circuit means in operation for counting and indicating visual indicia representative of whether responses to given interrogatories posed in a given sequence to a human operator of said machine are answered correctly or incorrectly, said given sequence being correlated with respective ones of said first operative conditions, selector means cooperative with said programming means operable to a plurality of successive positions in a given sequence corresponding to respective interrogatories in said given sequence of said interrogatories, means for allowing said selector means to be moved to successive positions in said sequence thereof and without possibility of returning said selector means to a prior position in said sequence of positions of said selector means, a plurality of manually operated switches connected in said circuit means cooperative with said programming means and each actuatable manually individually to a respective operative first position only when said programming means are in given relative positions of said different positions and said selector means is in each of said positions in said sequence of positions thereof and in which one of said switches is effective to cause said counters in operation to indicate indicia representative of a correct answer when said selector means is in a respective position in said sequence of positions and the remainder of said switches will cause said counters to indicate indicia representative of an incorrect answer if operated to said respective operative first position when said selector means is in said respective position, and means to preclude said switches from causing said counters to indicate more than once for each operation of a switch to its respective operative first position.

10. In a programmed machine usable as a teaching machine or for question-and-answer games and the like comprising, programmable circuit means comprising a power supply and programming means operable selectively to a plurality of different positions and having means for presetting a plurality of different circuits corresponding to different programs in said machine, said programs corresponding to operative preset conditions of readiness of said machine in which other operative conditions of said machine can be effected in dependence upon the operative conditions preset in said machine, indicator means comprising counting means in said machine electrically connectable to said circuit means in operation for counting and indicating indicia representative of the counts and representative of whether responses to given interrogatories posed in a given sequence to a human operator of said machine are answered correctly or incorrectly, said given sequence being correlated with respective ones of said first operative conditions, selector means cooperative with said programming means operable to a plurality of successive positions in a given sequence for presetting said different circuits in said circuit means successively, said operative positions being representative of respective interrogatories in said given sequence of said interrogatories, a plurality of manually operable switches connected in said circuit means cooperative with said programming means and said selector means and each actuatable to a respective operative first position when said selector means is in each of said positions in said sequence of positions thereof and in which one of said switches is effective to cause said indicator means in operation to count and indicate indicia representative of a count representative of the correct answers only when said programming means are in given relative positions of said different positions and said selector means is in a respective position in said sequence of positions and the remainder of said switches will cause said indicator means to count and indicate indicia representative of a count representative of incorrect answers when operated to said respective operative first position when said selector means is in a respective position in said sequence of positions.

11. In a programmed machine according to claim 10, in which said programming means comprises a plurality of means positionable in a plurality of respective positions for defining said plurality of different circuits successively and each closed only when said selector means is in said successive positions.

12. In a programmed machine according to claim 11, in which said programming means comprises a plurality of circuit defining members rotatable relative to each other angularly to a multiplicity of sets of angular relative fixed positions corresponding to said preset conditions, and each set of relative positions corresponding to a different energizable circuit effectively closed when said one switch corresponding to a correct answer is closed.

13. In a programmed machine according to claim 11, in which said circuit members comprise a plurality of drums relatively rotatable angularly and having means defining said different circuits.

14. In a programmed machine according to claim 13, in which said drums comprise a plurality of cylinders disposed extending in a common general direction and having an electrical conductor electrically connectable to said indicator means, said cylinders comprising contact portions electrically connected to said conductor disposed spaced thereon for energizing said indicator means to cause said counting means to count and indicate when a switch of said plurality of switches is actuated to said operative first position thereof and said selector means is in one of its positions in said sequence of positions thereof.

15. In a programmed machine usable as a teaching machine or for question-and-answer games and the like according to claim 10, including means allowing said selector means to be moved to successive positions in said sequence of operative positions without possibility of returning said selector means to a prior operative position in said sequence unless said selector means has been moved through the entire sequence of said operative positions.

16. In a programmed machine usable as a teaching machine or for question-and-answer games and the like according to claim 10, including means to preclude said indicator means for counting more than once each time a switch of said switches is operated to its operative first position.

References Cited

UNITED STATES PATENTS 2,877,568  3/1959  Besnard et al. _____ 35—48
2,983,053  5/1961  Bartholomew et al. _____ 35—9

EUGENE R. CAPOZIO, *Primary Examiner.*

W. NIELSEN, *Assistant Examiner.*